Patented Jan. 5, 1943

2,307,051

UNITED STATES PATENT OFFICE 2,307,051

COPPER ALLOY

Felix B. Litton and Alan U. Seybolt, Columbus, Ohio, assignors, by mesne assignments, to Electro Metallurgical Company, a corporation of West Virginia No Drawing. Application November 1, 1941, Serial No. 417,484

5 Claims. (Cl. 75—155)

The invention relates to copper alloys and more particularly to novel copper alloys of low melting point such as are useful for instance as brazing solders and weld filler metals.

Brazing, a soldering process in which a molten filler metal, usually copper or a copper alloy, is bonded to a metal workpiece without deeply melting the base metal, is a widely used and convenient method of joining many kinds of metals. It affords an economical and rapid method of making or repairing massive castings weighing many tons as well as for joining the most delicate members, and it is also widely used for surfacing parts subjected to wear.

The successful application of the brazing process requires suitable brazing solder or filler metal. This solder or filler metal should have a low melting temperature, it should flow readily when melted, and it should readily "wet" the surfaces to be joined. Also, the brazing material should adhere tenaciously to the members joined by it, should provide a strong joint and should be inexpensive. Although many brazing materials are available on the market, some are undesirably expensive, some do not readily "wet" steel or iron, some give rather brittle joints, and many have melting points higher than could be wished. Therefore, improved brazing materials are in demand.

A particular object of the present invention is a brazing material which may be used at a relatively low temperature to provide a strong, ductile joint. A more general object is a hot workable copper alloy having a low melting point.

These objects are achieved by the invention which comprises a copper alloy and brazing solder containing about 10% to 20% nickel, 30% to 45% zinc, and 2% to 4% phosphorus, the remainder substantially all copper except for incidental impurities. Preferably, the ratio of nickel to phosphorus in the alloy of the invention is between 3:1 and 5:1. The invention also includes a brazed joint consisting of at least two contiguous ferrous or nonferrous metal members joined by a deposit of the alloy of the invention.

Tests of the alloy of the invention have shown it to be tough and ductile, to have a melting point in the neighborhood of 800° C., and to wet iron, steel and copper-base alloys when melted and deposited on such materials. For example, an alloy brazing solder containing about 44% copper, 40% zinc, 12% nickel and 4% phosphorus (ratio of nickel to phosphorus=3:1), has an average Izod impact strength as cast of 6.25 foot pounds and is free-flowing at a temperature of about 793° C. When melted and deposited on steel or copper-base alloys it spreads evenly and thinly and adheres tightly to the base material when solidified, having little tendency to flake or chip off even when the base material is bent. The alloy is readily hot workable, suitably at a temperature of about 600° C.

If maximum toughness is desired in the alloy of the invention, the nickel-to-phosphorus ratio should be in the neighborhood of 4:1. The melting point of the alloy is lowered by tin or silver which may be present in small proportions as impurities or may on occasion be intentionally added. Preferably the silver content should not exceed about 3% on account of its cost, although as much as 7% silver does not detrimentally affect the properties of the alloy. Tin, however, seriously impairs the hot workability of the alloy and causes brittleness. It should not be present in a proportion greater than 1%.

Although the properties of the alloy of the invention are such as to make it excellently suited for use as a brazing material, its usefulness is not limited to that particular application. It may find use, for example, as a die casting alloy; and while a specific example of the alloy has been given by way of illustration, the invention is not limited to such example.

We claim:

1. An alloy containing about 10% to 20% nickel; 30% to 45% zinc; 2% to 4% phosphorus; and copper substantially the remainder.

2. A brazing solder having a melting point in the neighborhood of 800° C., containing about 10% to 20% nickel; 30% to 45% zinc; 2% to 4% phosphorus; and the remainder substantially all copper; the ratio of nickel to phosphorus being between 3:1 and 5:1.

3. A brazing solder having a melting point of approximately 790° C. and being composed of about 44% copper, 40% zinc, 12% nickel, and 4% phosphorus.

4. A brazed joint composed of at least two contiguous metal edges joined by a deposit of metal containing 10% to 20% nickel; 30% to 45% zinc; 2% to 4% phosphorus; and the remainder substantially all copper.

5. A brazed joint composed of at least two contiguous ferrous metal members joined by a deposit of metal containing about 12% nickel; about 40% zinc; 2% to 4% phosphorus; and the remainder substantially all copper.

FELIX B. LITTON.
ALAN U. SEYBOLT.